(12) United States Patent
Jeong et al.

(10) Patent No.: US 7,796,649 B2
(45) Date of Patent: Sep. 14, 2010

(54) SYSTEM AND METHOD FOR PROVIDING ADDITIONAL CHANNELS TO AN EXISTING COMMUNICATIONS DEVICE

(75) Inventors: Gibong Jeong, San Diego, CA (US); Ziad Asghar, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 1855 days.

(21) Appl. No.: 10/781,387

(22) Filed: Feb. 18, 2004

(65) Prior Publication Data

US 2005/0180384 A1 Aug. 18, 2005

(51) Int. Cl.
*H04J 1/00* (2006.01)
(52) U.S. Cl. .................................. 370/480; 370/503
(58) Field of Classification Search ............... None
See application file for complete search history.

(56) References Cited

U.S. PATENT DOCUMENTS

| | | | | |
|---|---|---|---|---|
| 5,212,808 A | * | 5/1993 | Su et al. | 455/502 |
| 5,600,706 A | * | 2/1997 | Dunn et al. | 455/456.2 |
| 5,956,345 A | * | 9/1999 | Allpress et al. | 370/480 |
| 6,393,280 B1 | * | 5/2002 | Lee et al. | 455/426.2 |
| 6,781,980 B1 | * | 8/2004 | Dajer et al. | 370/342 |
| 6,993,101 B2 | * | 1/2006 | Trachewsky et al. | 375/343 |
| 7,096,020 B2 | * | 8/2006 | Choi et al. | 455/439 |
| 2003/0224791 A1 | * | 12/2003 | Choi et al. | 455/436 |
| 2004/0185855 A1 | * | 9/2004 | Storm et al. | 455/445 |
| 2004/0213262 A1 | * | 10/2004 | Choi | 370/395.5 |
| 2005/0068990 A1 | * | 3/2005 | Liu | 370/516 |
| 2005/0073977 A1 | * | 4/2005 | Vanghi et al. | 370/335 |
| 2007/0073585 A1 | * | 3/2007 | Apple et al. | 705/14 |

* cited by examiner

*Primary Examiner*—Phuc Tran
(74) *Attorney, Agent, or Firm*—Wade J. Brady, III; Frederick J. Telecky, Jr.

(57) ABSTRACT

System and method for providing additional channels to an existing communications system. A preferred embodiment comprises a coprocessor (such as coprocessor 215) coupled to a modem (such as modem 205), wherein transmissions from the modem are routed to the coprocessor. The coprocessor then can insert transmissions that use the additional channels into the transmission from the modem. Timing consistency can be ensured by the coprocessor using scrambling and channelization codes that are provided by the modem. The use of the coprocessor can allow the use of an existing design for the modem rather than creating a new design when a revision to a technical standard is released, saving time and money for equipment manufacturers.

16 Claims, 5 Drawing Sheets

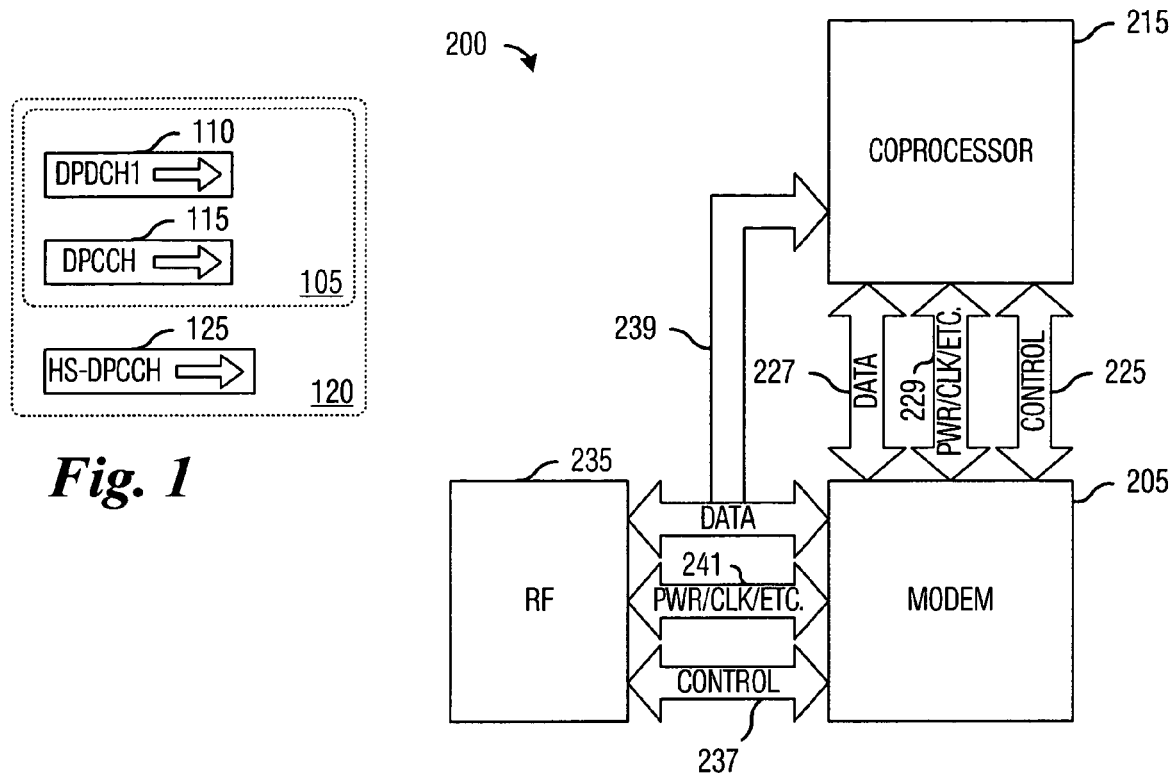
Fig. 1
Fig. 2
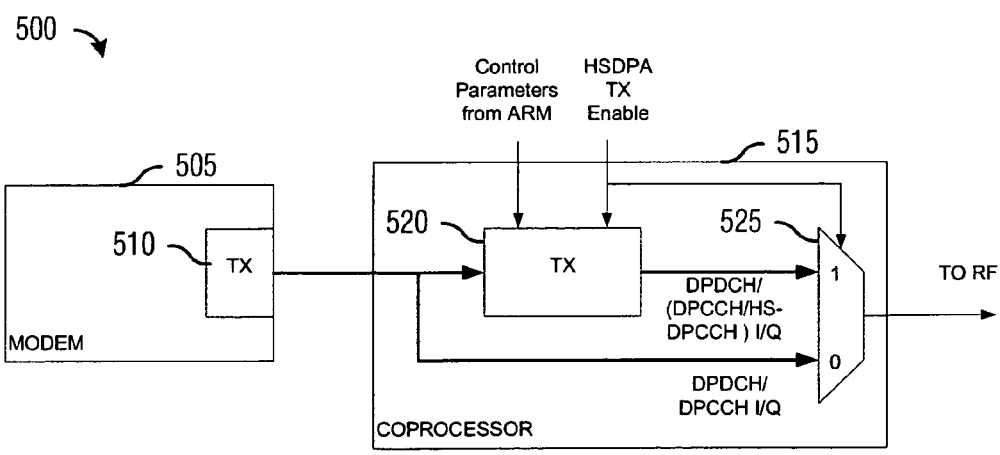
Fig. 5

SYSTEM AND METHOD FOR PROVIDING ADDITIONAL CHANNELS TO AN EXISTING COMMUNICATIONS DEVICE

TECHNICAL FIELD

The present invention relates generally to a system and method for digital communications, and more particularly to a system and method for providing additional channels to an existing communications system.

BACKGROUND

Recent history has shown that a widely adopted technical standard can provide a significant boost to the acceptance of new communications technologies. For example, the IEEE 802.11 series of technical standards (802.11, 802.11b, 802.11a, 802.11g, and so forth) has enabled a faster than expected acceptance of wireless networks and networking in the computer local area networking field. One major factor in the rapid acceptance of the IEEE 802.11 technical standards may be the interoperability of equipment that is compliant to one (or more) of the technical standards.

A series of technical standards for cellular-based communications system has done the same for personal communications. For example, for Universal-Mobile Telephony System (UMTS), the technical standards began with an initial release (Release 99) that specified a basic third generation voice-only communications system, with no support for high-speed downlink packet access (HSDPA). Subsequent releases (Release 5 and now Release 6) have added such functionality. Similarly, for code-division multiple access (CDMA), the technical standards began with IS-95, which was again a voice-only communications system, with follow-on standards (IS-2000, Release C (1XEV-DV), and now Release D) adding high-speed packet access.

Each new release of the technical standard typically adds new physical channels while maintaining support for existing physical channels specified in the older technical standards to ensure backward compatibility. This method of technical standard refinement has enabled the continued use of existing user-equipment (UE) while providing support for new functionality and requirements that were not foreseen.

With the adoption of a new release of the technical standard, equipment manufacturers must add the new functionality into their equipment or risk the loss of sales. One way to add the new functionality specified in the new release of the technical standard would be for an equipment manufacturer to design a new chipset that implements the new release of the technical standard.

One disadvantage of the prior art is that a completely new chipset would require a significant investment in money, since the design would need to be started from the ground up. The new design could require several fabrication and testing iterations, which can be expensive.

A second disadvantage of the prior art is that not only would a great deal of money need to be spent, a lot of time is also needed to completely design and test the chipset. The time and money spent may put the equipment manufacturer at a disadvantage with other equipment manufacturers who may be able to produce a similar chipset at a lower price or who may be able to bring the similar chipset to market in shorter time.

A third disadvantage of the prior art is that a requirement of many technical standards is compliance testing for any new design. Therefore, in addition to the time being spent upon designing the new chipset, time must be spent to ensure that the new design complies with the technical standard.

SUMMARY OF THE INVENTION

These and other problems are generally solved or circumvented, and technical advantages are generally achieved, by preferred embodiments of the present invention which provides for a system and method for providing additional channels to an existing communications system.

In accordance with a preferred embodiment of the present invention, a method for providing synchronization for an additional downlink channel comprising at a coprocessor, generating a synchronization strobe as a response to a triggering event, determining a time difference based upon the time stamp, at a modem, saving a time stamp when the synchronization strobe is received, and providing the time stamp to the coprocessor is provided.

In accordance with another preferred embodiment of the present invention, a method for providing an additional channel comprising detecting a timing for a transmission, selecting a time to insert an extra transmission for the additional channel into the transmission, and inserting the extra transmission for the additional channel into the transmission is provided.

In accordance with another preferred embodiment of the present invention, a circuit for use in providing an additional channel comprising a sync and tracking unit coupled to a transmission input, the sync and tracking unit containing circuitry to synchronize the circuit to a timing of a transmission provided by the transmission input, a matched filter coupled to the sync and tracking unit, the matched filter containing circuitry to determine the timing of the transmission, a subframe generator containing circuitry to create a data unit for transmission on the additional channel, and a data generation unit coupled to the transmission input, the sync and tracking unit, and the subframe generator, the data generation unit containing circuitry to encode and modulate the data unit and to insert the data unit into the transmission is provided.

In accordance with another preferred embodiment of the present invention, a wireless device comprising a modem coupled to a radio frequency (RF) circuit, the modem containing circuitry to encode and modulate a data stream to provide to the RF circuit for data transmission purposes and demodulate and decode a received signal from the RF circuit for data reception purposes, wherein the modem implements a first version of a technical specification and a coprocessor coupled to the modem and the RF circuit, the coprocessor containing circuitry to encode and modulate a data stream to provide to the RF circuit for data transmission purposes and demodulate and decode a received signal from the RF circuit for data reception purposes, wherein the coprocessor implements a second version of the technical specification is provided.

An advantage of a preferred embodiment of the present invention is that the use of a coprocessor to provide the support for the newly-added functionality permits an equipment manufacturer to keep the existing chipset. This can greatly reduce the design time since only the coprocessor needs to be designed and not an entirely new chipset.

A further advantage of a preferred embodiment of the present invention is that only the coprocessor will need to undergo functional and compliance testing. This can greatly reduce the testing time and can permit the equipment manufacturer to bring the chipset to market in a shorter amount of time.

Yet another advantage of a preferred embodiment of the present invention is that since the design and test times are shorter, the amount of money expended can be less. Therefore, it can permit the equipment manufacturer to bring the chipset to market at a lower price or have a larger profit margin than competitors.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a diagram of physical channels according to several versions of the UMTS technical specifications;

FIG. 2 is a diagram of a high level view of a portion of an electronic device, wherein a coprocessor provides support for additional channels, according to a preferred embodiment of the present invention;

FIG. 5 is a diagram of a portion of a device wherein additional functionality can be added to a modem via a coprocessor, according to a preferred embodiment of the present invention;

DETAILED DESCRIPTION OF ILLUSTRATIVE EMBODIMENTS

Figure 3A:
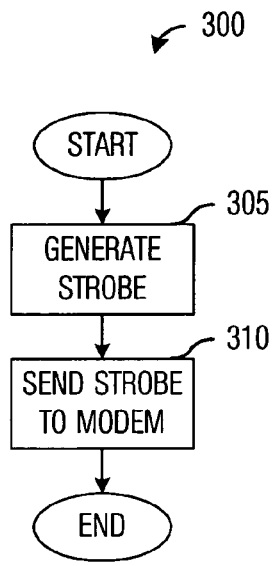
FIGS. 3a through 3b are diagrams of algorithms for maintaining demodulator timing integrity for a downlink, according to a preferred embodiment of the present invention.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a UMTS compliant communications system wherein a new release of the technical standard has included the addition of new physical channels. The invention may also be applied, however, to other communications systems, such as CDMA, GSM, and so forth. Furthermore, the present invention can also be applied in situations wherein an equipment manufacturer has a chipset for an existing technical standard and a new release of the technical standard adds new physical channels while maintaining existing physical channels to provide backwards compatibility.

With reference now to FIG. 1, there is shown a diagram illustrating a partitioning of transmit physical channels according to UMTS Release 99 (block 105) and UMTS Release 5 (and subsequent releases) (block 120) technical standards. According to the UMTS Release 99 technical standards, there can be two physical channels, a dedicated physical data channel (DPDCH1) 110 and a dedicated physical control channel (DPCCH) 115. In the UMTS Release 5 technical standards, a high-speed dedicated physical control channel (HS-DPCCH) 125 is available in addition to the DPDCH1 110 and DPCCH 115. The presence of the DPDCH1 110 and the DPCCH 115 in the UMTS Release 5 technical standards provides equipment compliant to that particular release, a backwards compatibility with UMTS Release 99 compliant equipment. Note that there can be a plurality of dedicated physical data channels and that the number of DPDCH can be a determining factor on where the HS-DPCCH is mapped, i.e., either an I or Q branch of the communications channel.

Whenever a revision to a technical standard is released, there can be new functionality that has been added. In some instances, the new release of the technical standard can also include new physical channels. When this is the case, equipment manufacturers will need to develop new chipsets to support the new release. As discussed previously, an equipment manufacturer can develop a new chipset to support the new release. However, this may not be an efficient solution due to time and money expenditures.

With reference now to FIG. 2, there is shown a diagram illustrating a high level view of a portion of an electronic device 200 that includes a modem 205 with coprocessor 215 solution to supporting a newly released version of an existing technical standard, wherein the coprocessor 215 supports the existing technical standard, according to a preferred embodiment of the present invention. According to a preferred embodiment of the present invention, rather than having to completely redesign the modem 205 to provide compliance with the new version of the technical standard, which could consume a large amount of money and time, the coprocessor 215 can be designed to provide the support for the new functionality that is added to the existing technical standard. Note that the coprocessor 215 could be used to provide support for changes to the air interface as specified in the technical standards, for example, while new functionality that can be implemented via changes to modem software or firmware can be implemented as an update to the modem code. Therefore, since the coprocessor 215 is the only new design in the electronic device 200, only the coprocessor 215 needs to be designed and functionally tested and undergo compliance testing, which can take a considerable amount of time and money.

The modem 205 and the coprocessor 215 may be two separately packaged integrated circuits on a circuit board that are coupled together via traces on the circuit board. Alternatively, the modem 205 and the coprocessor 215 can be separate integrated circuits that are not packaged and can be mounted together onto a single multi-chip module. In yet another alternative, the coprocessor 215 may be located on a daughterboard that can be connected to a motherboard containing the modem 205. Furthermore, the modem 205 and the coprocessor 215 can be located as two subchips on a single die, wherein the modem 205 and the coprocessor 215 may be separate units (chips) that are fabricated onto a single die.

The modem 205 may be coupled to the coprocessor 215 via a plurality of buses, a control bus 225 can be used to pass control information and/or signals between the modem 205 and the coprocessor 215, a data bus 227 can be used to carry data between the modem 205 and the coprocessor 215. The control bus 225 and the data bus 227 may also be implemented as a single physical bus that can be shared in a time-multiplexed fashion. A miscellaneous bus 229 can be use to provide signals such as clock signals, power, processor interrupts signals, direct memory access (DMA) request signals, synchronization signals, and so forth to the coprocessor 215. Both the modem 205 and the coprocessor 215 can be coupled to a radio frequency (RF) circuit 235. The RF circuit 235 can be used to provide information received by the electronic device 200 to the modem 205 and the coprocessor 215. The RF circuit 235 can also be used by the modem 205 and the coprocessor 215 to transmit information.

The RF circuit 235 can be coupled to the modem 205 via a plurality of buses (similar to the way that the modem 205 can be coupled to the coprocessor 215). A second control bus 237 and a second data bus 239 can be used to exchange control signals and data between the RF circuit 235 and the modem 205, while a second miscellaneous bus 241 can provide signals such as clock, power, and so forth to the modem 205. The coprocessor 215 may also be coupled to the RF circuit via the second data bus 239. While a received signal (received by the RF circuit 235) can be split by the second data bus 239 and be provided to both the modem 205 and the coprocessor 215, a simple combining of signals from the modem 205 and the coprocessor 215 may not be possible, due to signal conflicts. Circuitry (and logic) may need to be provided in order to combine signals from the modem 205 and the coprocessor 215 in a proper fashion to ensure that requirements as specified by the technical standards are met. A detailed discussion of this circuitry (and logic) is provided below. Note that depending upon implementation, the control bus 225, the data bus 227, and the miscellaneous bus 229 between the modem 205 and the coprocessor 215 may be the same buses as the second control bus 237, the second data bus 239, and the second miscellaneous bus 241 between the RF circuit 235 and the modem 205.

An issue that can arise when implementing a design using a coprocessor is that demodulator timing can be a problem. A simple shared clock solution can not be used due to inconsistent and unpredictable clock delay and skew as the clock propagates between the modem 205 and the coprocessor 205. In a communications system, such as UMTS, demodulator timing integrity is of greater concern because time offsets can be a crucial part of properly decoding received and encoding transmitted signals. Furthermore, in the UMTS Release 99 technical standards, it is specified that the modem 205 changes its transmit timing to track downlink timing drift and to stay within a certain range relative to the downlink timing drift (i.e., in response to changes in the propagation environment). While the specification places an upper limit of a quarter chip every 200 milliseconds, the changing transmit timing can present a problem with adding an additional channel (e.g. HS-DPCCH) at the right time. The demodulator timing can present a problem in both uplink and downlink directions.

Figure 3B:
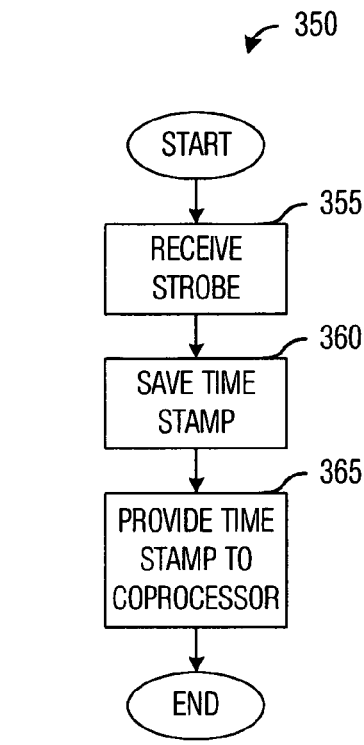

With reference now to FIGS. 3a and 3b there are shown flow diagram illustrating coprocessor (algorithm 300, FIG. 3a) and modem (algorithm 350, FIG. 3b) algorithms for maintaining demodulator timing integrity for a downlink, according to a preferred embodiment of the present invention.

In a downlink situation, the addition of additional channel(s) can be accomplished relatively simply, since to a receiver, the addition of additional channel(s) may only require that the receiver be able to decode the additional channel(s). This can be accomplished by maintaining demodulator timing integrity in the receiver. By maintaining demodulator timing integrity, different components in the receiver may be able to consistently demodulate (and decode) the received downlink. Note that the FIGS. 3a and 3b illustrate a technique for synchronizing that makes use of timing measurements based upon a strobe. This method can typically be used for coarse scale synchronization, normally during initialization.

According to a preferred embodiment of the present invention, the algorithm 300 can execute on a processing element or a controller or a custom circuit in a coprocessor (such as the coprocessor 215 (FIG. 2)) the user equipment. The algorithm 300 can be executed when the coprocessor is being initialized or when it is being woken up from sleep. The execution of the algorithm 300 may be controlled by a processing element (or controller or custom control circuit or so forth), which may be responsible for the overall operation of the user equipment. The processing element can determine when the algorithm 300 is executed, for example, when the coprocessor 215 detects a counter wrap-around condition, when the coprocessor 215 receives a certain interrupt request, and so on. Note that once the user equipment is actively operating, the algorithm 300 may not need to be run again since the clock rate of the coprocessor 215 and of a modem (such as the modem 205 (FIG. 2)) are essentially the same and does not typically change over time.

As discussed above, the coprocessor 215 may begin executing the algorithm 300 after an occurrence of a triggering event, such as a counter wrap-around or an interrupt. After the occurrence of the triggering event, the coprocessor 215 can generate a strobe (block 305). The strobe can be referred to as a frame-sync strobe and can be provided to the modem 205 (block 310). After the coprocessor 215 has generated the strobe signal and passes the strobe signal to the modem 205, the algorithm 300 is complete and terminates. As discussed above, the algorithm 300 may not need to be re-executed until the coprocessor 215 has been reinitialized or woken up from sleep.

With reference now to FIG. 3b, at the modem 205, the algorithm 350 may execute on a processing element or a controller or a custom circuit in the modem 205. The processing element can begin when it receives the strobe signal from the coprocessor 215 (block 355). The strobe signal may be implemented as an edge detector set to watch a signal input. When it receives the strobe signal, the processing element of the modem 205 can save a time stamp into a specified register or a memory location (block 360). The time stamp can be a chip counter that increases (or decreases) over time. Once the processing element of the modem 205 receives the strobe signal, the value of the chip counter can be read out and stored in the specified register (or memory location). The chip counter can be reset after the strobe signal is received and the counter's value is read out.

The time stamp can be provided to the coprocessor 215 (block 365), wherein the time stamp can be used to determine a timing difference between coprocessor 215 and the modem 205. This timing difference can be used to maintain demodulator timing integrity between the coprocessor 215 and the modem 205.

Note that the chip counter in the modem 205 should be of sufficient size to count the number of chips expected to pass during the time difference between the modem 205 and the coprocessor 215 without overflow. The expected time difference should not be large since the modem 205 and the coprocessor 215 can be different integrated circuits within the same circuit board and their time difference should not be exceedingly large. To further enhance the resolution of the chip counter, the chip counter may count fractions of chips rather than whole chips. The chip counter in the modem 205 can be started when the user equipment is first powered on or reset. The chip counter can also be started when the coprocessor 215 is woken from sleep mode.

Figure 4:
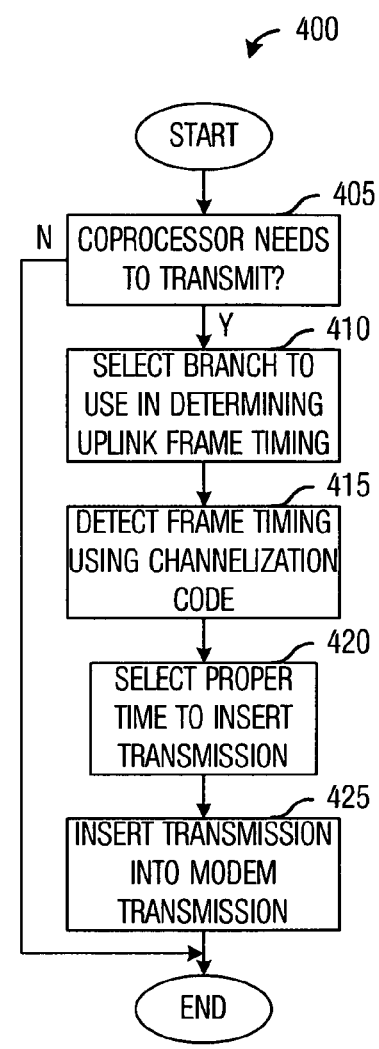
FIG. 4 is a diagram of an algorithm for maintaining demodulator timing integrity for an uplink, according to a preferred embodiment of the present invention.

With reference now to FIG. 4, there is shown a flow diagram illustrating an algorithm 400 for use in maintaining demodulator timing integrity for an uplink, according to a preferred embodiment of the present invention. According to a preferred embodiment of the present invention, the algorithm 400 may execute on a controller or a processing element or a custom circuit in a coprocessor (such as the coprocessor 215 (FIG. 2)). The algorithm 400 should be executed only when the coprocessor 215 is active, such as, when high-speed packet communications is enabled (the user equipment is operating in a compliant communications network) or when the high-speed communications is enabled and the coprocessor 215 is not in sleep mode. When the coprocessor 215 is inactive, then transmissions from a modem (such as the modem 205 (FIG. 2)) can be provided without interaction with the coprocessor 215. According to a preferred embodiment of the present invention, when the coprocessor 215 is enabled (active), transmissions can be directed through the coprocessor 215, even in the case when the coprocessor 215 has no messages of its own to transmit.

The controller (of the coprocessor 215) can begin when it has determined that it needs to transmit (block 405), such as sending an acknowledgement message back to a base station to acknowledge the receipt of a transmission, and so forth. The controller can determine if there is a need to transmit by an interrupt that can be asserted to signify a message to transmit, by checking a memory (or register) that can be used as a flag to signify a message to transmit, by checking the state of a buffer that can be used to store a message to transmit if there is a message to transmit, or so forth.

If there is a need to transmit, then the controller can select which branch to use to determine uplink frame timing (block 410). Note that uplink slot timing can also be used in place of uplink frame timing without changing the spirit of the present invention and that while the subsequent discussion discusses the use of frame timing, slot timing may be used in place of frame timing. According to the UMTS Release 5 technical standards, data transmissions should be carried on an I branch while control transmissions should be carried on a Q branch of a signal transmitted from a transmitter. The I and Q branches of a signal represent in-phase (I) and quadrature phase (Q) streams of the signal and are considered to be well understood by those of ordinary skill in the art of the present invention. However, according to the technical standards, the HS-DPCCH channel can be carried on either the I or the Q branch, based on the number of DPDCH channels present in the modem transmission. In the case of a single DPDCH, the HS-DPCCH channel is transmitted on the Q branch, for simplicity this case is assumed henceforth. The uplink frame timing can be detected by using either the DPDCH channel or the DPCCH channel from the modem transmission so it is proposed that the channel with the most power be used to determine frame timing. The transmit power in the baseband of a branch (I or Q) of the modem transmission can be controlled by a gain factor, $\beta d$ for the I branch and $\beta c$ for the Q branch. Therefore, determining the branch with the higher power can be relatively simple.

According to a preferred embodiment of the present invention, if $\beta c$ is greater than or equal to $\beta d$, then the Q branch is at a higher power and the Q branch should be used to determine initial sync, the frame timing, and for tracking purposes and if $\beta d$ is greater than $\beta c$, then the I branch is at a higher power and the I branch should be used for initial sync, frame timing, and tracking. Note that the comparison between $\beta c$ and $\beta d$ can be changed, for example, the selection of the Q branch can be changed from "if $\beta c$ is greater than or equal to $\beta d$" to "if $\beta c$ is greater than $\beta d$" and the corresponding I channel selection comparison can be similarly changed.

After selecting the branch to be used for initial sync and tracking, the controller can detect the uplink frame timing by using the channelization code of either the DPCCH channel (for the case when the Q branch is the selected branch) or the DPDCH channel (for the case when the I branch is the selected branch) (block 415). Since the coprocessor 215 is coupled to the modem 205, the coprocessor 215 can be provided with information about the DPCCH and DPDCH channels, such as their channelization codes. After determining the uplink frame timing (block 415), the controller can select a proper time to insert the HS-DPCCH transmission (block 420). Note that when using frame timing, the HS-DPCCH transmission that is inserted may take the form of a frame (or frames) and when using slot timing, the HS-DPCCH transmission may take the form of a slot (or slots). A discussion of the selection of the proper time to insert the HS-DPCCH transmission can be found below. After selecting the proper time to insert the HS-DPCCH transmission, the controller may insert the transmission into the uplink signal (block 425). After the transmission is complete, the algorithm 400 can terminate to be re-executed when the controller once again determines that it needs to transmit.

The technique for synchronization illustrated in FIG. 4 may be based upon uplink channel matched filtering, wherein the timing can be determined via the use of a matched filter. A detailed explanation of the use of the matched filter to obtain frame timing is provided below. This technique can be used for fine scale synchronization, during both initialization and during normal operations to track timing drifts.

With reference now to FIG. 5, there is shown a diagram illustrating a portion of a device 500 wherein additional functionality can be added to a modem 505 via a coprocessor 515, according to a preferred embodiment of the present invention. As discussed previously, the modem 505 may be adherent to a technical standard, which has since been updated with additional functionality, such as an additional channel(s). Rather than designing a new modem that is compliant with the updated technical standard, the coprocessor 515 can be designed to provide support for the additional functionality and when used in conjunction with the modem 505, full compliance with the updated technical standard can be achieved.

As displayed in FIG. 5, the modem 505 and the coprocessor 515 are serially coupled to each other, with an output from the modem (via a transmit circuit 510) becoming an input to the coprocessor 515. Internal to the coprocessor 515, the input (the output of the modem 505) can be split, with a first being provided to a transmit circuit 520 of the coprocessor 515 and a second being provided to a multiplexer 525. The multiplexer 525 may also be coupled to an output of the transmit circuit 520. According to a preferred embodiment of the present invention, a control signal, shown in FIG. 5 as "HSDPA TX Enable" can be used to enable both the transmit circuit 520 and the multiplexer 525. Therefore, when the transmit circuit 520 is enabled, the multiplexer 525 can be set to selectively couple the output of the transmit circuit 520 to an output of the coprocessor 515. When the transmit circuit 520 is disabled, then the multiplexer 525 can selectively couple the input (the output of the modem 505) to the output of the coprocessor 515.

Therefore, when the device 500 is operating in a communications system that does not support the additional functionality as provided for in the updated technical standards, the transmit circuit 520 can be disabled and the multiplexer 525 can be set to pass the input of the coprocessor 515 to the output of the coprocessor 515. However, if the wireless device 500 is operating in a communications system that does support the additional functionality, then the transmit circuit 520 can be enabled and the multiplexer 525 can be set to pass the output of the transmit circuit 520 to the output of the coprocessor 515. Note that although displayed in FIG. 5 as being located inside the coprocessor 515, the multiplexer 525 may be located outside of the coprocessor 515 without affecting the function of the present invention.

Figure 6:
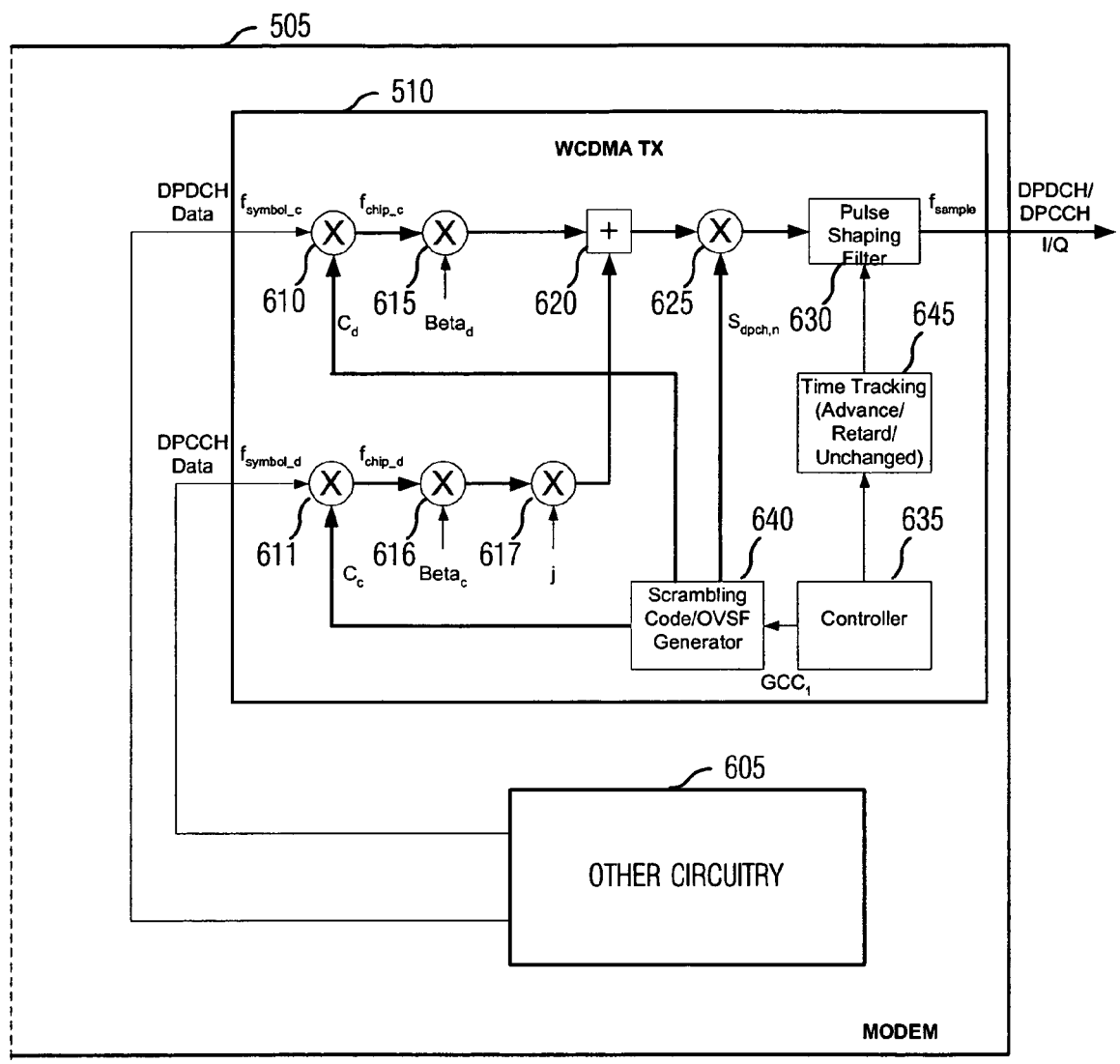
FIG. 6 is a diagram of the modem shown in FIG. 5, according to a preferred embodiment of the present invention.

With reference now to FIG. 6, there is shown a diagram illustrating a detailed view of the modem 505 (FIG. 5), according to a preferred embodiment of the present invention. The detailed view of the modem 505 shows emphasis upon the transmit circuit 510 with remaining circuitry in the modem 505 being lumped into an "other circuitry" block 605. As discussed previously, the transmit circuit 510 can be responsible for manipulating and forming information provided by the other circuitry block 605 of the modem 505 into a form that can be ready for transmission, namely DPDCH and DPCCH channels in I and Q branches. The other circuitry block 605 can provide to the transmit circuit 510 data to be transmitted via the DPDCH (via the I branch) and the DPCCH (via the Q branch).

Once the data is provided to the transmit circuit 510, preferably in the form of data symbols, it may be multiplied with a channelization code, which can be provided by a scrambling code/OVSF generator 640. The specific channelization code generated by the scrambling code/OVSF generator 640 can be controlled by a controller 635. Note that the scrambling code/OVSF generator 640 may differ in design based upon the communications system. For example, a UMTS release 99 compliant modem can have a different scrambling code/OVSF generator from a CDMA compliant modem.

The channelization code, as generated by the scrambling code/OVSF generator 640, can be multiplied with the data inputs to the transmit circuit 510 by multiplier 610 (for the DPDCH channel data) and multiplier 611 (for DPCCH channel data). After being spread, the transmit power in the baseband of the branches can be adjusted by multiplier 615 (with $\beta d$ for the DPDCH channel data) and multiplier 616 (with $\beta c$ for the DPCCH channel data). The DPCCH channel data can receive further manipulation by being rotated by a factor of j (the complex number). This can be achieved by multiplying the DPCCH channel data by the complex number via a multiplier 617.

The two branches of channel data can then be combined into a single stream of data by an adder 620. The data stream can them be scrambled by a scrambling code, which can also be generated by the scrambling code/OVSF generator 640, by a multiplier 625. A pulse shaping filter 630 can be used to ensure that the spread data stream can meet regulatory and technical specifications. The pulse shaping filter 630 can also make timing adjustments to the spread data stream via a time tracking signal produced by a time tracking unit 645. The time tracking unit 645 can be used to advance, retard, or leave unchanged the timing of the spread data stream. The controller 635 can provide information to the time tracking unit 645, which it can use in determining the proper timing. Alternatively, the controller 635 can determine the proper timing itself and it can then command the time tracking unit 645 to generate the proper commands to the pulse shaping filter 630 achieve the proper timing. Output of the pulse shaping filter 630 can then be ready for transmission.

Figure 7:
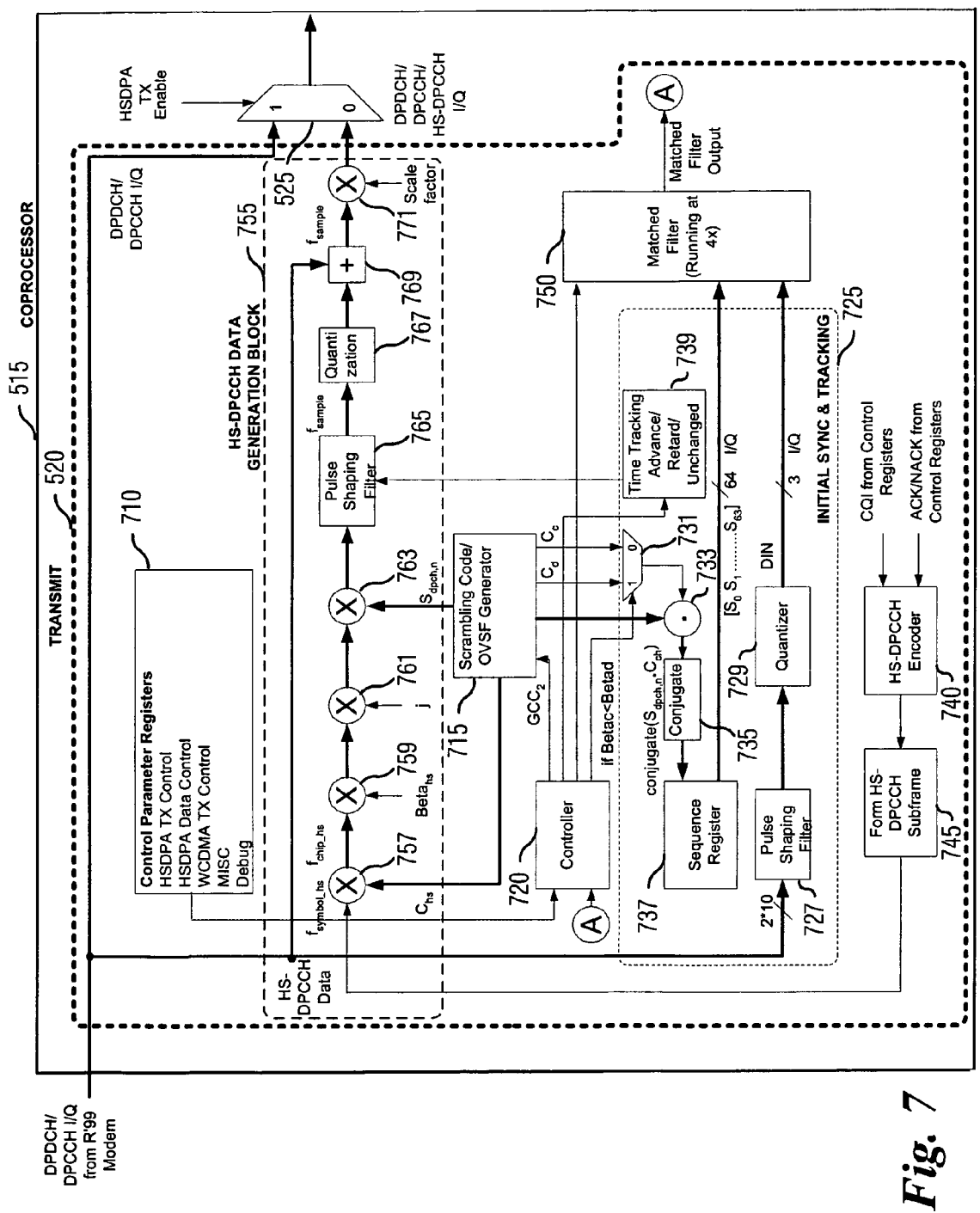
FIG. 7 is a diagram of the coprocessor shown in FIG. 5, according to a preferred embodiment of the present invention.

With reference now to FIG. 7, there is shown a diagram illustrating a detailed view of the coprocessor 515 (FIG. 5), according to a preferred embodiment of the present invention. The coprocessor 515 is shown in FIG. 7 as being made up of the transmit circuit 520 and the multiplexer 525. The multiplexer 525 can be used to select between an output from the modem 505 or from the transmit circuit 520, which can be a combination of the output from the modem 505 and the coprocessor 515. Note that the coprocessor 515 may contain other circuitry not displayed in FIG. 7, since emphasis is placed on how the coprocessor 515 combines its transmissions with that of the modem 525 (FIG. 5) in order to provide full compliance with the updated technical standard.

The transmit circuit 520 can contain the following units: a control parameter register block 710, a scrambling code/OSVF generator 715, a controller 720, an initial sync and tracking unit 725, an encoder 740, a subframe generator 745, a matched filter 750, and a data generation block 755. The control parameter register block 710 can be a unit of multiple registers that can be used for purposes such as transmit control (for both the modem 505 and the coprocessor 515), data control, debugging, and so forth. The scrambling code/OSVF generator 715 can be used to generate a scrambling code and a spreading code when the coprocessor 515 has a transmission. The scrambling code/OVSF generator 715 can be provided with timing information (and other information unique to a device containing the coprocessor 515) from the controller 720, which can be necessary in generating the proper codes. Note that the scrambling and spreading codes generated by the scrambling code/OSVF generator 715 should be used solely for transmissions generated by the coprocessor 515 and not those generated by the modem 505, which may have already been scrambled and spread.

The initial sync and tracking unit 725 can serve two main functions: during an initial setup phase, the initial sync and tracking unit 725 can be used to synchronize the coprocessor 515 with the uplink frame timing from the modem 505 and during a normal transmission phase, the initial sync and tracking unit 725 can be used to track timing changes in the timing of the modem 505 and to adjust the timing of the coprocessor 515 to match the timing changes. A pulse shaping filter 727 can be used to decode the signal from the modem. The output of the quantizer 729 can be provided to the matched filter 750 wherein the uplink frame timing of the modem 505 can be detected. The matched filter 750 can be used to detect the uplink frame timing of the modem 505 from the output of the quantizer 729, by descrambling it with a sequence that can be based upon a scrambling and channelization code of the modem 505. Note that the quantizer 729 can be used in order to simplify the design of the matched filter 750, it can do so by decreasing the bitwidth of the data and its output can be passed onto the matched filter 750, for example, only the three most significant bits of each quantized value is passed. While only a portion of each quantized value is passed, the quantizer 729 should have a resolution that is sufficient to adequately capture the value of the output of the pulse shaping filter 727.

The matched filter 750 may attempt to match the output of the quantizer 729 with a sequence that is stored in a sequence register 737, wherein the sequence can be defined as a conjugate of a point wise product of the scrambling code and the channelization code. Note that the scrambling code and the channelization code are those of the modem uplink, which are known by the modem 505 and can be provided to the coprocessor 515. According to a preferred embodiment of the present invention, the channelization code may be selected depending upon the transmit power in the baseband of the branches, i.e., the values of βc and βd. This can be implemented as a multiplexer 731, which can be used to select the channelization code based on a comparison of βc and βd. A point wise multiplier 733 can be used to multiply the channelization code with the scrambling code (provided by the scrambling code/OSVF generator 715). A conjugate unit 735 can perform the conjugate operation, with the result being stored in the sequence register 737.

The encoder 740 can have inputs from the control parameter register block 710, namely the ACK/NACK and CQI registers. According to the UMTS Release 5 technical standards, whenever a value is written into the ACK/NACK register, it should be repeated ten times and placed into a slot in a HS-DPCCH subframe. Similarly, when a value is written into the CQI register, the contents can be read out and encoded using a specified code (by the encoder 740) and placed into a slot in the HS-DPCCH subframe. The subframe generator 745 can be used to generate the HS-DPCCH subframe from outputs produced by the encoder 740, using specifications provided by the UMTS Release 5 technical standards.

The data generation block 755 may have as its input a HS-DPCCH subframe as produced by the subframe generator 745 and change it into a form that can be combined with transmissions from the modem 505. A first operation involves the application of a channelization code to the HS-DPCCH subframe by a multiplier 757. According to a preferred embodiment of the present invention, the multiplier 757 may contain circuitry to equalize the length of the two terms (vectors) being multiplied together and then the multiplication may be implemented as a point wise multiplication. The channelization code may be generated by the scrambling code/OVSF generator 715 based upon information provided by the controller 720 and information specific to a device containing the coprocessor 515. After being spread, the baseband transmit power for transmission by the coprocessor 515 can be applied by multiplication with a gain factor, βhs, via a second multiplier 759. A third multiplier 761 can be used to apply a rotation to the scrambled HS-DPCCH subframe, while a fourth multiplier 763 can apply a scrambling code (provided by the scrambling code/OVSF generator 715). A pulse shaping filter 765 can be used to ensure that the spread data stream meets technical and regulatory specifications. A time tracking unit 739, having an input from the controller 720 and coupled to the pulse shaping filter 765 can be used to adjust the timing of the transmission from the coprocessor 515. A quantizer 767 can then scale the signal, where it can be combined with the transmissions from the modem 505 via an adder 769. Finally, the combined transmission can be scaled via a scale factorization unit 771 to meet desired (or required) power constraints.

The initial synch and tracking unit 725, along with the matched filter 750, can be used to determine the timing of the transmission from the modem 505 and the data generation block 755 can be used to combine output of the subframe generator 745 with the transmission from the modem 505. Then, the output of the subframe generator 745 can be inserted into the transmission from the modem 505. The timing of when to insert the output of the subframe generator 745 can be specified by the technical specifications and can be a relative amount of time with respect to the uplink frame timing as determined by the initial synch and tracking unit 725.

Figure 8:
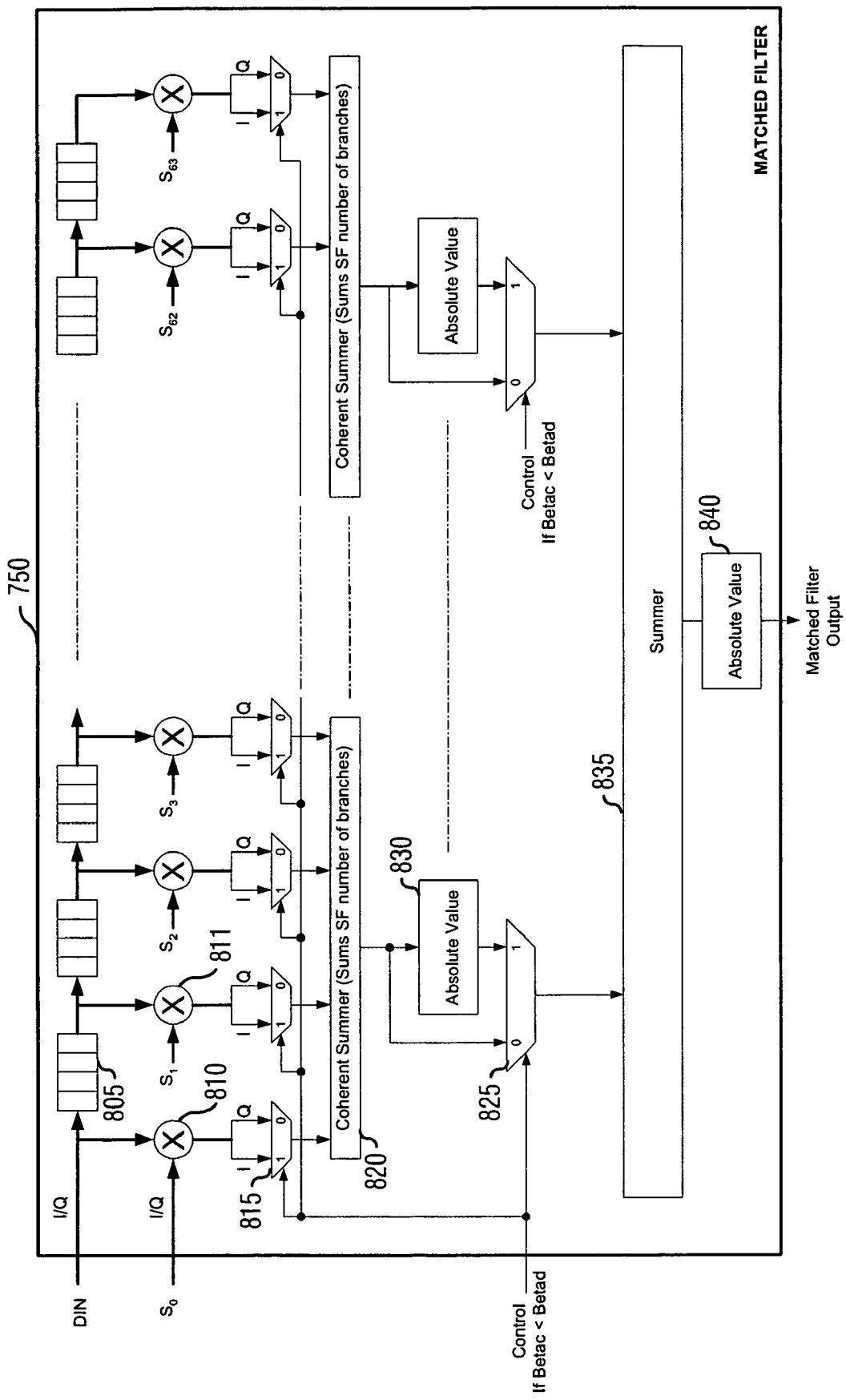
FIG. 8 is a diagram of the matched filter shown in FIG. 7, according to a preferred embodiment of the present invention.

With reference now to FIG. 8, there is shown a diagram illustrating a detailed view of the matched filter 750 (FIG. 7), according to a preferred embodiment of the present invention. As discussed above, the matched filter 750 can continually descramble the output of the modem 505 (after pulse shape filtering and quantization by the initial synch and tracking unit 725 (FIG. 7)). The matched filter 750 can descramble the output of the modem 505 with the sequence stored in the sequence register 737 (FIG. 7) which can be the conjugate of a point wise product of the scrambling code and the channelization code.

The matched filter 750 may perform the descrambling of the output of the modem 505 by serially multiplying the output of the modem 505 with a single value from the sequence. For example, a first multiplier 810 can multiply the output of the modem 505 with value "S0" from the sequence, while a second multiplier 811 can multiply the output of the modem 505 with value "S1" from the sequence. Note that between each multiply, the output of the modem 505 can be buffered by a buffer, for example, a first buffer 805 between multipliers 810 and 811. An output from each multiplier (for example, multiplier 810) can have its I and Q branches separated and then provided to a multiplexer (for example, multiplexer 815) wherein a control signal whose value may be determined by the transmit power in the baseband of the branches, i.e., the values of βc and βd, can be used to select which branch can be provided to a coherent summer (such as coherent summer 820). Note that the number of multipliers (such as multiplier 815) can be determined by the spreading factor of the spreading code used. The spreading factor of a spreading code is considered to be well understood by those of ordinary skill in the art of the present invention. Depending upon the value of βc and βd, the output of the matched filter 750 can be computed in a different manner.

If βc is greater than or equal to βd, then the Q branch can be used and coherent combining should be used to produce the output of the matched filter 750. A series of coherent summers, such as coherent summer 820, can be use to coherently combine the Q branch output of a "spreading factor" number of multipliers. The output from each of the series of coherent summers can be provided to a multiplexer, such as multiplexer 825, that can be used to select between the output of the coherent summer or the absolute value of the output of the coherent summer, wherein the absolute value of the output of the coherent summer can be provided by an absolute value unit, such as absolute value unit 830. Note that the absolute value units can be used to support incoherent combining, which may be used if βc is less than βd and will be discussed below. A summer 835 can be used to combine the outputs of the multiplexers, such as the multiplexer 825 and an absolute value unit 840 can provide a magnitude only output for the matched filter 750.

If βc is less than βd, then the I branch can be used and incoherent combining should be used to produce the output of the matched filter 750. The series of coherent summers, such as the coherent summer 820 can be used to coherently combine the I branch output of each multiplier. However, the summer 835 combines the absolute values of the outputs of each of the series of coherent summers, therefore, incoherent combining is used to produce the output of the matched filter 750. The output of the matched filter 750 can be used for both initial synchronization and subsequent time tracking to provide adjustments for the drifting transmit timing.

With reference now back to FIG. 7, as discussed above, the controller 720 can be used to adjust the timing of the transmission from the coprocessor 515 (FIG. 5). According to a preferred embodiment of the present invention, the matched filter 750 can produce an output every quarter of a chip time. The output of the matched filter can be used during initial synchronization to adjust the timing as described in the following pseudocode:

```
while i < number_of_chips_per_frame * oversampling_rate {
    if matched_filter_output(i-1) > matched_filter_output(i) then
        maximum_output = matched_filter_output(i-1)
        time_index = i-1
    else
        maximum_output = matched_filter_output(i)
        time_index = i
end.
```

The pseudocode effectively searches for the largest output from the matched filter 750 and saves it, along with the time index that produced the largest output to a memory location or a register. The time index can then be used as the initial timing for the transmission of the modem 505. For example, in a WCDMA system, wherein the number_of_chips_per_frame can be equal to 38400 and the oversampling_rate can be equal to 4, then after the above pseudocode (or an actual implementation of the pseudocode) is executed for one frame, the time_index can be set to the frame timing of the modem 505. Note that the pseudocode displayed above may be an implementation of a "Find_Max" routine. The use of the "Find_Max" routine will be discussed below.

Note that with minor changes to the pseudocode displayed above, the slot timing of the transmission can be detected rather than the frame timing. An advantage in the use of the slot timing may be that with the use of the slot timing, the timing can be detected at an earlier point in time and any adjustments to the timing can be performed earlier. Furthermore, the pseudocode makes use of a single peak in the matched filter output to determine the frame timing. The pseudocode can be modified to make use of a combination of peaks instead of a single peak to determine the frame timing (or slot timing if so modified). An advantage in the use of a combination of multiple peaks is that the use of multiple peaks can help provide a measure of immunity to glitches and transient noise that can result in an erroneous detection of the frame timing.

The controller 720 and the matched filter 750 can also be used to detect changes in the timing of the transmission of the modem 505 during normal operations. If a change has been detected, then the controller 720 can provide timing adjustments to ensure that the coprocessor 515 maintains consistent timing with the modem 505. The output of the matched filter 750 may then be used as described in the pseudocode below:

```
time_index(previous) = 0
while (coprocessor is enabled)
    time_index(current) = Find_Max
    time_tracking_output = sign(time_index(current) -
    time_index(previous))
    time_index(previous) = time_index(current)
end.
```

The controller 720 may be used to continually monitor the output of the matched filter 750 and it can detect a change in the time index of the current frame (being transmitted by the modem 505) by comparing the time index of the current frame (time_index(current)) with the time index of the previous frame (time_index(previous)). The controller 720 can provide a time index adjustment (time_tracking_output) to time tracking unit 730, which can be the difference between the time index of the current frame and the previous frame. The time index adjustment (time_tracking_output) may be used as follows:

```
if (time_tracking_output) is > zero (0), then retard the timing;
else
    if (time_tracking_output) is < zero (0), the advance the timing;
else make no changes to the timing.
```

Note that routine, "Find_Max," can be used to determine the time index for the current frame.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A circuit for use in providing an additional channel comprising:
   a sync and tracking unit coupled to a transmission input, the sync and tracking unit containing circuitry to synchronize the circuit to a timing of a transmission provided by the transmission input;
   a matched filter coupled to the sync and tracking unit, the matched filter containing circuitry to determine the timing of the transmission;
   a subframe generator containing circuitry to create a data unit for transmission on the additional channel; and
   a data generation unit coupled to the transmission input, the sync and tracking unit, and the subframe generator, the data generation unit containing circuitry to encode and modulate the data unit and to insert the data unit into the transmission.

2. The circuit of claim 1, wherein the timing is a frame timing, and wherein the data unit is a frame.

3. The circuit of claim 1, wherein the timing is a slot timing, and wherein the data unit is a slot.

4. The circuit of claim 1, wherein the sync and tracking unit comprises:
   a sequence register coupled to the matched filter, the sequence register containing a sequence that is based on channelization code of a stronger of two branches in the transmission;
   a pulse shaping filter coupled to the transmission input and the matched filter, the pulse shaping filter to decode the transmission; and
   a timing tracking unit coupled to the data generating unit, the time tracking unit containing circuitry to adjust sample timing of the data generating unit to keep it in sync with the transmission's timing.

5. The circuit of claim 4, wherein the sequence stored in the sequence register is the conjugate of a point wise product of the scrambling code and a channelization code of the stronger of the two branches.

6. The circuit of claim 4, wherein the sync and tracking unit can keep track of a shifting transmit timing in the transmission.

7. The circuit of claim 1, wherein the matched filter descrambles the transmission with a sequence based on a channelization code of a stronger of two branches in the transmission.

8. The circuit of claim 1, wherein the data generation unit adds the encoded and modulated data unit with the transmission.

9. The circuit of claim 8, wherein the data generation unit scrambles, gain modifies, and spreads the data unit with a channelization code and a scrambling code provided by a scrambling code generator.

10. The circuit of claim 1, wherein when there is no data unit to transmit, no data units are inserted into the transmission.

11. A wireless device comprising:
a modem coupled to a radio frequency (RF) circuit, the modem containing circuitry to encode and modulate a first data stream to provide to the RF circuit for data transmission purposes and demodulate and decode a first received signal from the RF circuit for data reception purposes, wherein the modem implements a first version of a technical specification for the modem data transmission and reception;
a coprocessor coupled to an output of the modem and to the RF circuit, the coprocessor containing circuitry to encode and modulate a second data stream to provide to the RF circuit for data transmission purposes and demodulate and decode a second received signal from the RF circuit for data reception purposes, wherein the coprocessor implements a second version of the technical specification for the coprocessor data transmission and reception;
wherein the RF circuit contains circuitry to wirelessly transmit the first and second data streams and wirelessly receive the first and second received signals; and
wherein the coprocessor comprises:
a sync and tracking unit coupled to the modem, the sync and tracking unit containing circuitry to synchronize the circuit to a timing of a transmission provided by the modem;
a matched filter coupled to the sync and tracking unit, the matched filter containing circuitry to determine the timing of the transmission;
a subframe generator containing circuitry to create a data unit for transmission on the additional channel; and
a data generation unit coupled to the transmission input, the sync and tracking unit, and the subframe generator, the data generation unit containing circuitry to encode and modulate the data unit and to insert the data unit into the transmission.

12. The wireless device of claim 11, wherein the second version of technical specification is a superset of the first version of the technical specification.

13. The wireless device of claim 12, wherein the coprocessor implements a portion of the second version of the technical specification not included in the first version of the technical specification.

14. The wireless device of claim 11, wherein the wireless device is used in a wireless communications system.

15. The wireless device of claim 14, wherein the wireless communications system is a CDMA Release C compliant system.

16. A wireless device comprising:
a modem coupled to a radio frequency (RF) circuit, the modem containing circuitry to encode and modulate a first data stream to provide to the RF circuit for data transmission purposes and demodulate and decode a first received signal from the RF circuit for data reception purposes, wherein the modem implements a first version of a technical specification for the modem data transmission and reception;
a coprocessor coupled to an output of the modem and to the RF circuit, the coprocessor containing circuitry to encode and modulate a second data stream to provide to the RF circuit for data transmission purposes and demodulate and decode a second received signal from the RF circuit for data reception purposes, wherein the coprocessor implements a second version of the technical specification for the coprocessor data transmission and reception;
wherein the RF circuit contains circuitry to wirelessly transmit the first and second data streams and wirelessly receive the first and second received signals;
wherein the modem is coupled to the RF circuit via a multiplexer; and
wherein the multiplexer is located inside the coprocessor.

* * * * *